United States Patent [19]

Kamiyama et al.

[11] Patent Number: 4,793,057
[45] Date of Patent: Dec. 27, 1988

[54] APPARATUS FOR MOUNTING POWER TRANSMISSION BELTS ON AND REMOVING SAME FROM PULLEYS

[75] Inventors: Yoshihiko Kamiyama, Kobe; Misao Fukuda, Miki; Akihiro Nagata, Komaki, all of Japan

[73] Assignee: Mitsuboshi Belting, Limited, Nacata, Japan

[21] Appl. No.: 27,856

[22] Filed: Mar. 19, 1987

[30] Foreign Application Priority Data

Jan. 16, 1987 [JP] Japan .................................. 62-8701

[51] Int. Cl.⁴ ............................................ B21D 53/10
[52] U.S. Cl. ....................................... 79/822; 29/809
[58] Field of Search ................. 29/771, 809, 822, 407, 29/720

[56] References Cited

U.S. PATENT DOCUMENTS 4,630,344 12/1986 Boyle et al. ...................... 29/822 X

FOREIGN PATENT DOCUMENTS

472752 8/1975 U.S.S.R. ................................ 29/822

Primary Examiner—Timothy V. Eley
Attorney, Agent, or Firm—Wood, Dalton, Phillips, Mason & Rowe

[57] ABSTRACT

The present invention is directed to an apparatus for automatically delivering power transmission belt preforms from a supply to a work station for entrainment on a pair of cooperating pulleys, in which position a cutting, abrading operation, or the like can be performed on the belt. Once the belt is completed, structure automatically removes the belt from the pulleys and delivers the same to a desired destination.

16 Claims, 5 Drawing Sheets

APPARATUS FOR MOUNTING POWER TRANSMISSION BELTS ON AND REMOVING SAME FROM PULLEYS

FIELD OF THE INVENTION

This invention relates to a structure for automatically bringing power transmission belt preforms from a supply into entrained relationship on pulleys associated with a work station at which the belt side edges are cut or abraded and for automatically removing a completed belt from the pulleys upon completion of the cutting or abrading operation.

BACKGROUND ART

In one method of belt manufacture, a continuous belt sleeve is formed and a plurality of belt preforms with square or rectangular cross section are separated therefrom. Individual belt preforms are entrained upon spaced pulleys, at least one of which is driven to cause the belt to travel at a predetermined speed. As the belt is travelling, cutting units simultaneously shape the belt side edges to a desired configuration. Upon completion of the cutting operation, the belt is removed from the pulleys and another belt preform is substituted.

The efficiency of the above method hinges on the speed at which preforms are delivered to the pulleys and finished belts are removed therefrom and replaced by another preform. Heretofore, generally the delivery of preforms to the pulleys and/or the removal of the completed belts have been manually carried out, which severely limits production capability for a system.

DISCLOSURE OF THE INVENTION

The present invention is directed to an apparatus for automatically delivering power transmission belt preforms from a supply to a work station for entrainment on a pair of cooperating pulleys, in which position a cutting, abrading operation, or the like can be performed on the belt. Once the belt is completed, structure automatically removes the belt from the pulleys and delivers the same to a desired destination.

More specifically, the invention comprehends a belt transfer mechanism with push-out structure for delivering belts seriatim from a supply to a pick-up area. Cooperating plates grasp the belt at the pick-up area and through a shuttle mechanism the grasping plates are moved to a belt release position in which the grasped belt loosely surrounds the pulleys. The plates are then separated to drop the grasped belt so that an inside surface thereon bears against the uppermost pulley. Once the operation performed at the work station is completed, a pair of arms are moved adjacent the uppermost pulley and pivoted vertically upwardly between spaced sides of the belt sufficiently to move the belt upwardly and axially away from the pulleys.

With the inventive structure, belt movement is automatically controlled between the point of supply and the point of ultimate disposition of the completed belt. A substantial savings in manufacturing time results with the automated system according to the invention. All the system elements are synchronized to maximize efficiency.

In a preferred form, the storing structure is provided to accept belts in hanging, side-by-side, horizontal relationship. The storing structure has a curved upper surface against which the inside surface of each belt rests and over which the belts are readily slidable. The push-out structure has an associated plate which engages the trailing belt in the supply and urges the belts laterally to situate a leading belt in the pick-up position. Detecting structure senses the passing of a belt moving towards the pick-up area and automatically lowers the plates which grasp the individual belts.

The shuttle mechanism then delivers the grasped belt to a transfer position immediately over the pulleys. A control automatically releases the plates to drop the belt onto the pulleys. The shuttle structure then returns to its starting position, elevated over the pick-up area for the belts.

Upon completion of the operation at the work station, the belt removal structure is pivoted into a position wherein the arms can engage and draw the completed belt off of the pulleys, after which the entire structure pivots to deliver the completed belt for desired disposition.

The inventive structure accounts for rapid, automatic, and consistent mounting of belt preforms on pulleys for the performance of various operations and removal therefrom of completed belts.

DESCRIPTION OF THE PREFERRED EMBODIMENT

Figure 1:
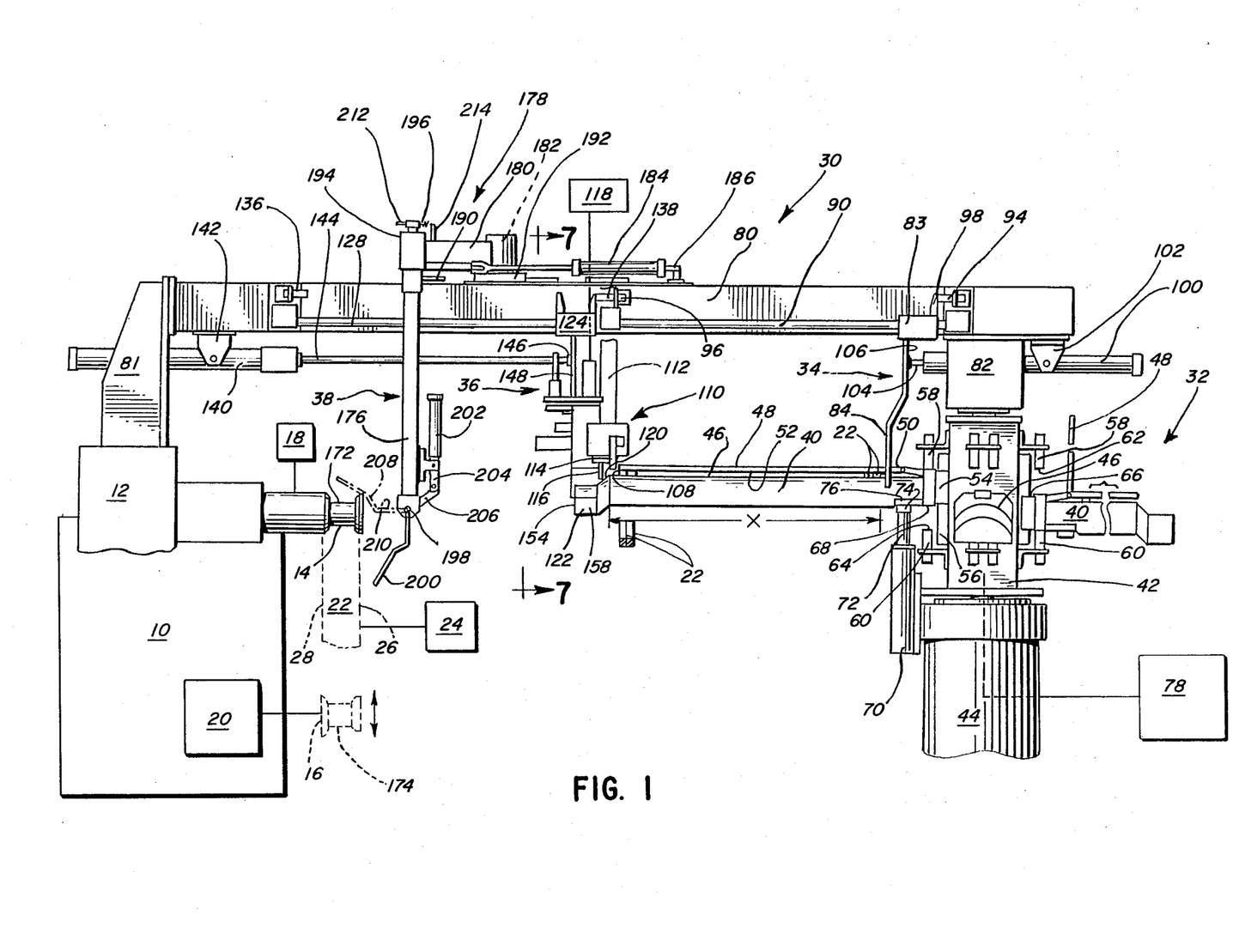
FIG. 1 is a side, elevation view of a belt work station and associated structure for delivering belt preforms to the work station and removing completed belts therefrom according to the invention.

A belt treating apparatus with the associated inventive structure incorporated is shown at 10 in FIG. 1, partially in schematics. Briefly, the apparatus 10 comprises a frame 12 which supports vertically spaced drive and driven pulleys 14, 16, respectively, for rotation at a work station. Rotation of drive pulley 14 is imparted through a conventional type motor 18. The driven pulley 16 is carried on a slider 20 which is mounted for vertical movement towards and away from the drive pulley 14. Movement of the slider 20 toward the drive pulley 14 reduces the center-to-center spacing of the pulleys 14, 16 to facilitate placement of a belt preform 22 thereover. With a belt 22 entrained on the pulleys 14, 16, the slider 20 moves away from the drive pulley 14 a predetermined distance to tension the belt 22 as desired. The tensioned belt 22 is operated upon by a grinder mechanism 24, which cuts the belt side edges 26, 28 to desired angles. Since generally only one belt preform 22 at a time is worked on by the belt treating apparatus 10, the belt preforms 22 must be delivered thereto individually and removed therefrom upon completion of the side cutting operation.

The present invention is directed to the structure, shown generally at 30 in FIG. 1, for delivering individual belt preforms 22 from a supply station 32 to the treating apparatus 10, after which a completed belt is automatically removed from the pulleys 14, 16 and delivered to a point of use. The structure 30 has a belt push-out mechanism 34 for shifting belts at the supply station 32 to a pick-up area, a belt shuttle mechanism 36 for delivering belts from the pick-up area to the pulleys 14, 16 and for situating the belts 22 in surrounding relationship to the pulleys 14, 16, and a belt removing mechanism 38 for drawing a completed belt off of the pulleys 14, 16 and delivering the completed belt to a point of use.

Figure 3:
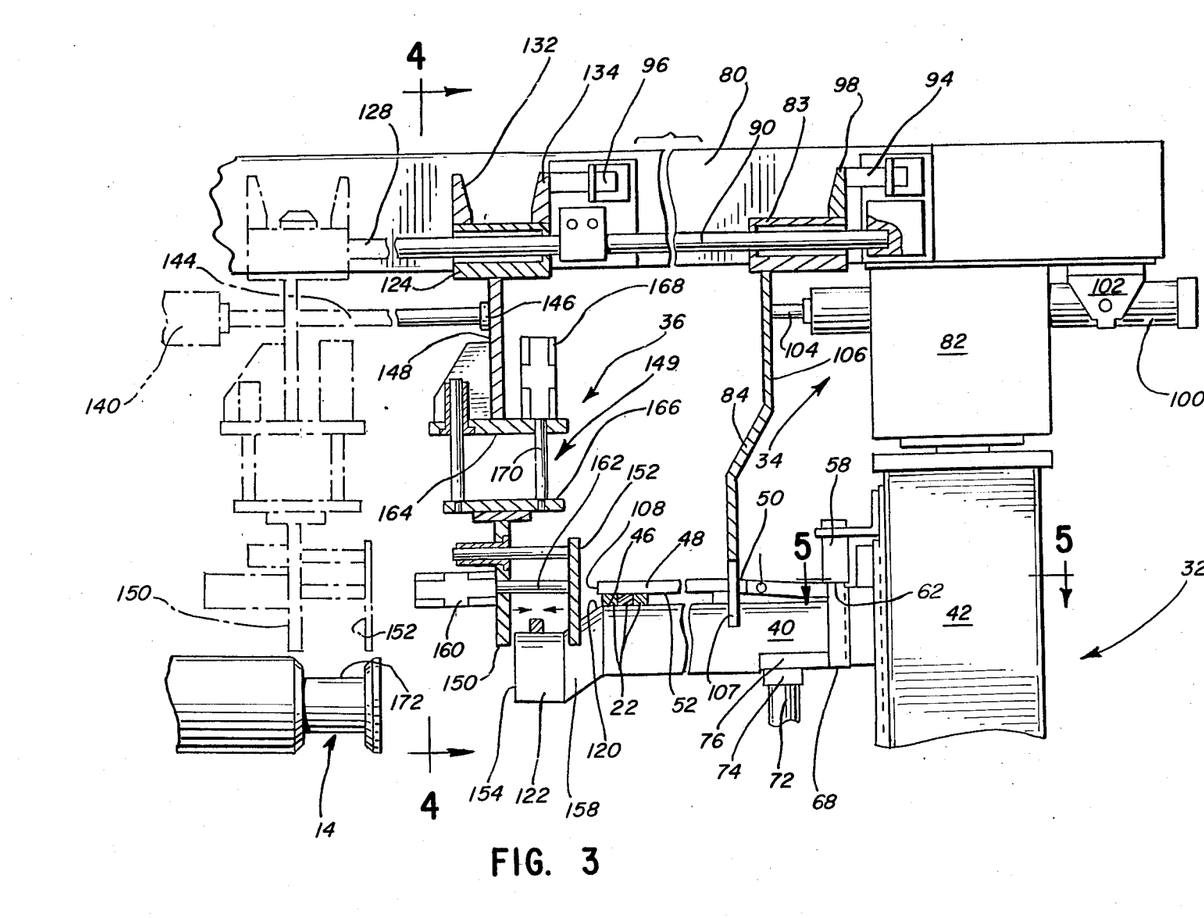
FIG. 3 is an enlarged, fragmentary, elevation view of a shuttle portion of the apparatus in FIGS. 1 and 2 for grasping belts at a pick-up area and delivering the same to the work station.
Figures 4, 5:
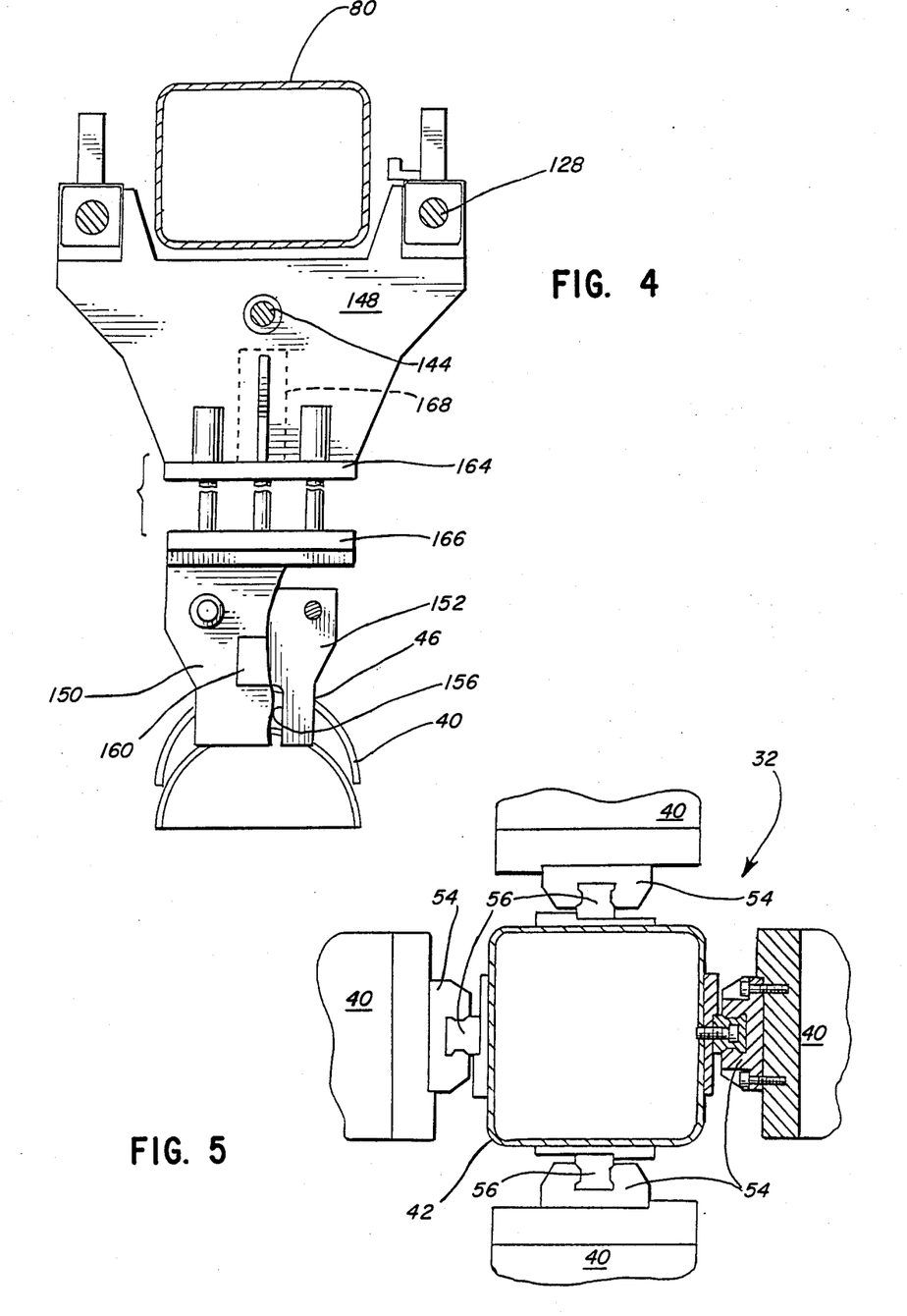
FIG. 4 is an enlarged, sectional view taken along line 4—4 of FIG. 3.
FIG. 5 is an enlarged, fragmentary, sectional view taken along line 5—5 of FIG. 3.

At the belt supply station 32, provision is made for storing a plurality of the aforementioned belt preforms 22. As shown in FIGS. 1, 3 and 5, at the belt supply station 32 a plurality of peripherally spaced booms 40 are carried in cantilever fashion from a supporting post 42, having a generally square cross-sectional configuration. The post 42 is mounted for rotation about a vertical axis relative to a fixed base 44. In the described embodiment four belt carrier booms 40 are shown, however this is not to be viewed as limiting and is rather a design consideration.

Figure 7:
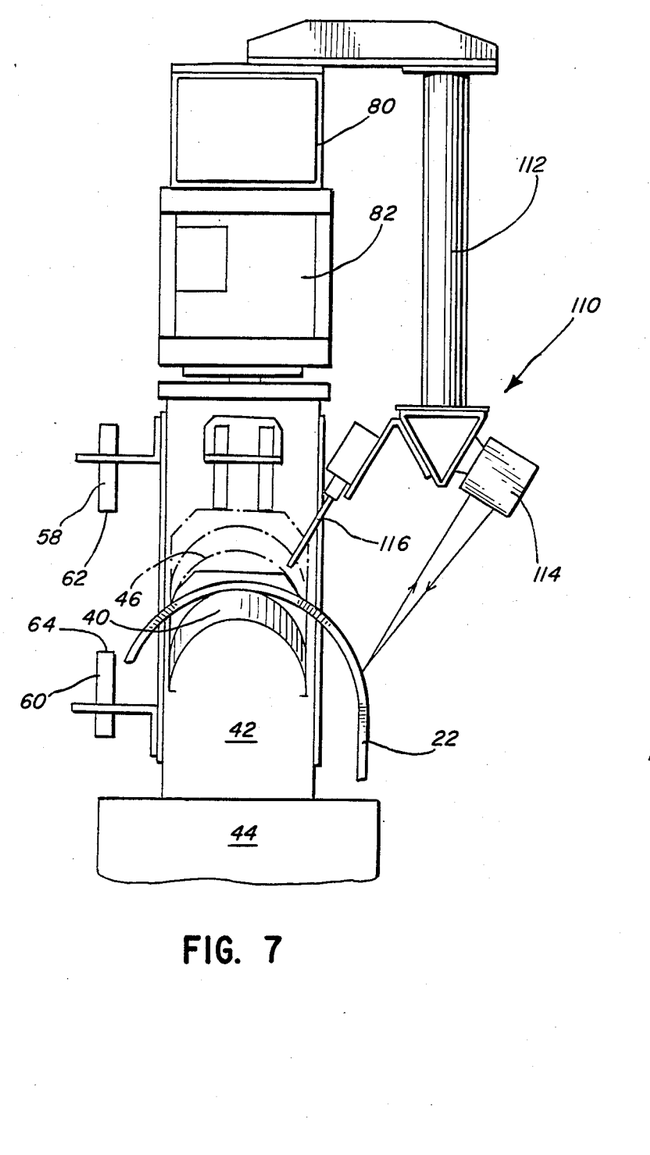
FIG. 7 is a sectional view along line 7—7 of FIG. 1 with belt sensing and delivering structure removed.

As shown most clearly in FIGS. 1 and 7, and also in FIGS. 3 and 5, each boom has a belt storage length X with a semi-spherical cross-sectional configuration and a curved upper surface 46 arranged to support the belt preforms 22 so that the preforms 22 are readily slidable along the length thereof. The belt preforms 22 are hung edge-to-edge on the boom surface 46, as shown in FIG. 1. A holding plate 48 is pivotally attached to the boom 40 at its one end 50 for movement between a first, loading position, shown on the right boom 40 in FIG. 2, wherein the belts can be manually placed on the boom 40, and a second position, shown on the left boom in FIG. 1, wherein the underside surface 52 of the plate 48 closely overlies the belt preforms 22 arranged on the boom 40 to confine the belt preforms 22 closely against the boom 40 in substantially uniform orientation.

Only one of the four booms 40 is operative at any one time. The boom extending towards the left in FIG. 1 from the post 42 is in the operative position. The other three booms 40 can be loaded at the same time that the belt preforms 22 are being fed off of the operative boom 40.

Each boom 40 has an associated guide element 54, which cooperates with a rail 56 on the supporting post 42 to guide translatory vertical movement of the boom 40 relative to the post 42. The limits of the range of vertical movement of each boom are established by upper and lower stop elements 58, 60 respectively. The upper stop element 58 has downwardly facing surfaces 62 and the lower stop element has upwardly facing, cushioned surfaces 64, which respectively abut an upwardly facing surface 66 and a downwardly facing surface 68 on the boom in the vicinity of the post 42, to arrest travel of the boom 40.

Vertical movement of each boom 40 is controlled through a cylinder 70 fixedly secured to the base 44. The cylinder 70 has an associated reciprocating piston 72 having a free end 74 that engages a pad 76 on the underside of the operative boom 40. With the piston 72 withdrawn, all booms 40 are in their downwardmost position resting upon the cushioned, lower stop elements 60. The post 42 is indexed automatically through a control 78 to situate the desired boom in the operative position of FIG. 1. Thereafter, the cylinder 70 is operated to extend the boom 40 until its upwardmost position is realized.

Figure 2:
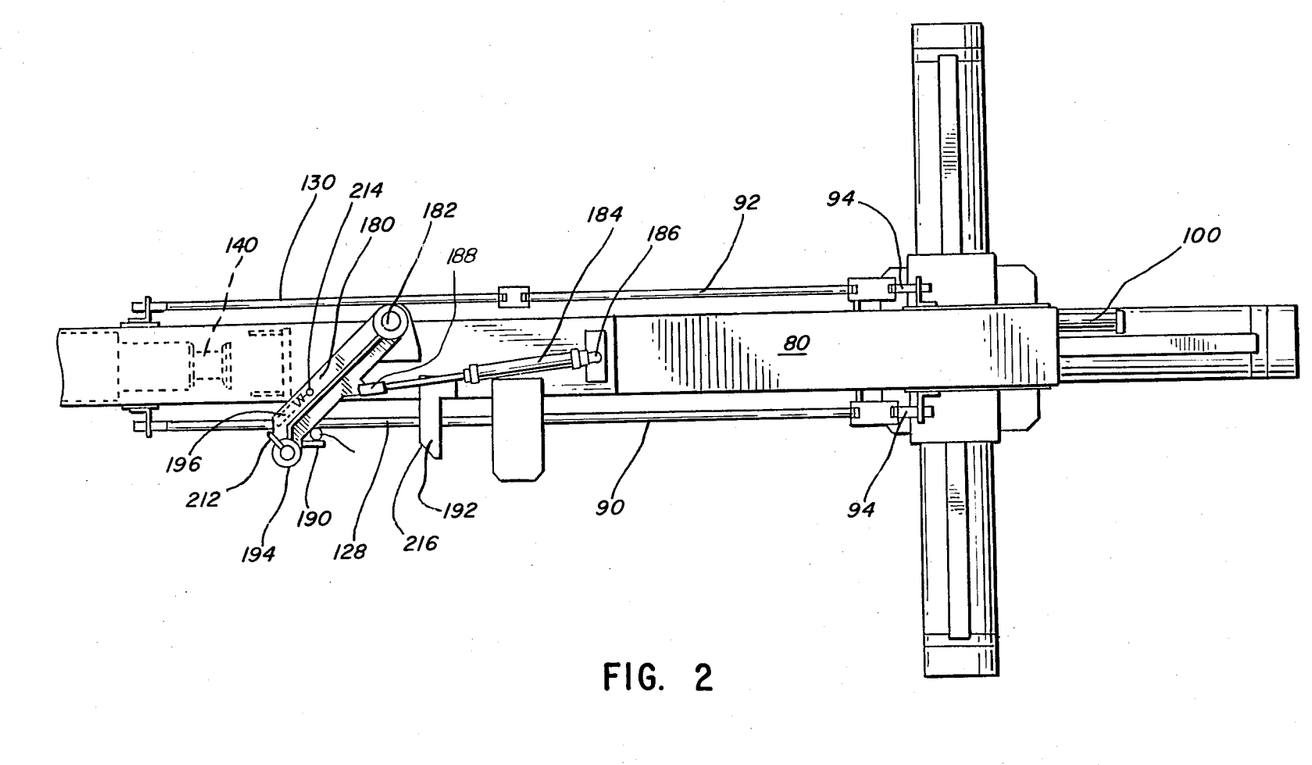
FIG. 2 is a fragmentary, plan view of the structure in FIG. 1.

Once the loaded boom 40 is elevated, the individual belt preforms 22 are shifted from right to left in FIG. 1 by the belt push-out mechanism 34. As seen in FIGS. 1-3, the push-out mechanism 34 is carried on an elongate beam 80, which spans between an upstanding section 81 of the frame 12 and a base 82 supported immediately above the post 42. The push-out mechanism 34 consists of a pair of sliders 83 cooperatively carrying a depending pusher plate 84 for movement lengthwise thereof, i.e. left and right in FIGS. 1-3. Bars 90, 92 are mounted on the support beam 80 at opposite sides thereof to guide translation of the push-out mechanism 34. Each rail 90, 92 supports one of the sliders 83. The limits of the range of movement of the sliders are established by stops 94, 96 on the beam 80. A vertically projecting stop pad 98 on each slider 83 encounters the stops 94, 96 at the extreme positions of travel.

Movement of the pusher plate 84 is accomplished through a cylinder 100, supported cooperatively by a bracket 102 on the beam 80 and the base 82. The cylinder 100 has a reciprocating piston 104 which engages a surface 106 of the plate 84. The reciprocating piston 104 moves parallel to the rails 90, 92 to effect the desired movement of the plate 84. The range of motion of the piston 104 is sufficient that the plate 84 traverses the entire length X of the active boom.

Figure 6:
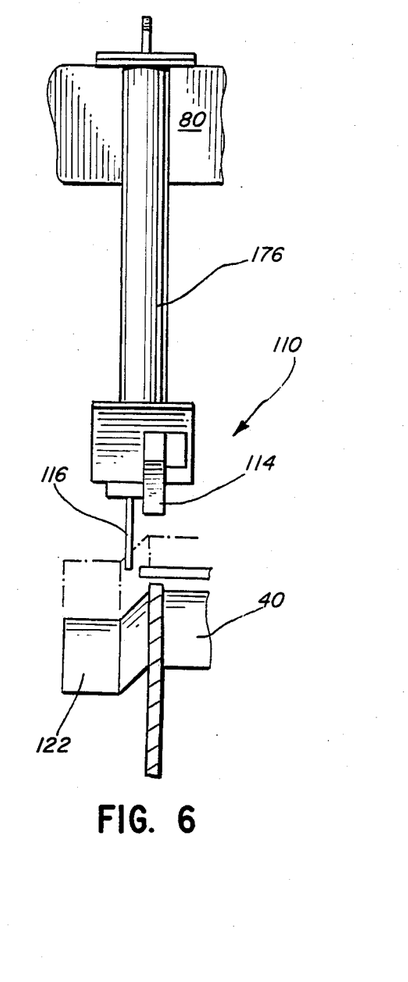
FIG. 6 is an enlarged, fragmentary, end, elevation view of structure for sensing passage of a belt to the pick-up area.

The plate 84 has a bifurcated lower end 107 that straddles the beam 40 and engages the trailing belt preform 22. Right to left movement of the plate 84 shifts the entire supply of belt preforms 22 beneath the plate 48. The belt preforms 22 pass beyond the free end 108 of the plate 48 remote from the post 42 and are detected by a sensor mechanism 110, as shown in FIGS. 1, 6 and 7.

The sensor mechanism 110 is carried in depending fashion from the beam 80 by a vertical arm 112. The mechanism 110 has a photoelectric sensor 114 to detect the presence of a belt passing the free end 108 of the plate 48. The sensor mechanism 110 also has a coil spring limit switch 116 for detecting the presence of the active boom 40 in its operative position. Detection of a passing belt by the sensor 114 produces a signal to a control 118 for actuating the belt shuttle mechanism 36.

Once a belt preform 22 passes the sensor 114, it slides down a ramped surface 120 on the boom and lands at a pick-up area 122 at the free end of the boom 40 at which point the belt 22 is picked up by the shuttle mechanism 36.

The shuttle mechanism 36 is suspended from sliders 124 mounted for translatory movement lengthwise of the beam 80 on guide bars 128, 130. Each slider 124 has spaced, upwardly projecting stop elements 132, 134, which cooperate respectively with stops 136, 138 on the beam 80 to limit the range of movement of the belt shuttle mechanism 36 between the solid and dotted line positions in FIG. 3.

Reciprocative movement of the sliders 124 and associated shuttle mechanism 36 is imparted through a cylinder 140 carried cooperatively by a bracket 142 on the beam 80 and the frame section 81. The cylinder 140 has a piston 144 with a free end 146 that engages a hanger 148 for a height adjustment mechanism 149 for spaced belt grasping plates 150, 152, situated immediately therebelow.

With the shuttle mechanism 36 in a pick-up position, i.e. fully to the right in FIGS. 1-3, the plate 150 is spaced from the free end 154 of the operative boom 40 by a distance less than the width of the belt preforms 22. The height adjustment mechanism 149, which will be described in detail hereafter, lowers the plates 150, 152 so that the plate 150 is in vertically overlapping relationship with the pick-up area 122 on the beam 40. The plate 152 has a downwardly opening U-shaped cut-out 156 (FIG. 4) to allow passage of the plate 152 into vertically overlapping relationship with the beam section 158 defining the ramp surface 120. Operation of the height adjustment mechanism 149 is synchronized with the delivery of the belt preforms 22 onto the pick-up area 122 so that a single belt resides between the plates 150, 152 with the shuttle mechanism 36 in the solid line position in FIG. 3. A cylinder 160 is mounted on plate 150 and has a reciprocating piston 162 connected to plate 152. Upon retracting the piston 162 of the belt preform the pick-up area 122 is grasped between the plates 150, 152.

The height adjustment mechanism 149 has a plate 164 fixed at right angles to the hanger 148 and a second plate 166 fixedly connected to the belt grasping plate 150. A cylinder 168 attached to the plate 164 reciprocatively moves a piston 170 attached to plate 166. Extension and retraction of the piston 170 in the cylinder 168 respectively lowers and raises the plate 166 and in turn the belt grasping plates 150, 152.

Upon the belt being grasped between the plates 150, 152, the entire shuttle mechanism 36 is shifted towards the left in FIGS. 1-3 to situate the grasped belt 22 in a release over the pulleys 14, 16. The driven pulley 16 at the point of delivery of the belt preform 22 is raised sufficiently through the slider 20 that it will not interfere with the belt delivered through the shuttle mechanism 36. Once the shuttle mechanism 36 has aligned the belt preform 22 over the pulley grooves 172, 174 and pulleys 14, 16 respectively, as shown in phantom in FIG. 3, the cylinder 160 is operated to extend the piston 162 and thereby increase the spacing between the plates 150, 152 and release the belt so that it drops against the upper pulley 14. The shuttle mechanism 36 then returns to its original position with the plates 150, 152 aligned over the beam pick-up area 122 and elevated thereover. In that position, the shuttle mechanism 36 does not interfere with the operation of the belt removing mechanism 38.

As seen in each of FIGS. 1-3 the belt removing mechanism 38 has a vertically extending pole 176 suspended through a swivel mechanism at 178 from the beam 80. The swivel mechanism 178 comprises an arm 180 mounted for rotation relative to a pivot pin 182 on the beam 80 about a vertical axis. Pivoting of the arm 180 is accomplished through a cylinder 184 having one end 186 pivotally attached to the beam 80 and its other end 188 pivotally attached at an intermediate portion to the arm 180. The cylinder 184 pivots the arms between one extreme, wherein the pole 176 resides as shown in FIG. 1, and a second position, wherein the arm is pivoted counterclockwise in FIG. 2 so that a projection 190 carried on the pole 176 abuts a stop 192 on the beam 80. In the first position of the arm 180, a belt 22 can be removed from the pulleys 14, 16 and in the second position the removed belt 22 is delivered to a point of use.

The pole 176 is rotatably carried in a sleeve 194 for rotation relative to the sleeve 194 about a vertical axis. A coil spring 196 urges the pole 176 towards an orientation wherein the axis 198 of rotation of spaced belt removing arms 200 is at right angles to the rotational axis of the pulley 14 with the arm 180 in the belt removal position. The reason for spring loading the pole 176 will be apparent from the discussion below.

The arms 200 are each substantially L-shaped and spaced from each other a distance slightly greater than the diameter of the pulley 14. The length of the pole 176 is such that the axis 198 of rotation of the arms 200 is approximately at the height of the rotational axis of the pulley 14. The arms 200 are rotatable between the solid line and phantom positions in FIG. 1 through a cylinder 202. The cylinder 202 has an extendable piston 204 that engages a plate 206 connected to the arms 200. Extension of the piston 204 pivots the arms 200 clockwise from the solid line position to the phantom position.

The belt removing mechanism 38 operates as follows. Before the arms 200 are actuated, the pulley 16 is elevated to release tension on the completed belt 22. The untensioned belt tends to bulge laterally, thereby diminishing its vertical extent. With the pole 176 in the FIG. 1 position, extension of the piston 204 through cylinder 202 pivots arms 200 so that the arms 200 move between the vertically extending portions of the belt entrained on the pulleys 14, 16. Further pivoting of the arms 200 draws the belt upwardly and axially away from the pulleys 14, 16. Once the arms 200 realize the phantom position of FIG. 1, the belts slide down a then inclined ramp 208 and are deposited in a seat 210 defined between the ramp 208 and pole 176. The spring loading of the pole 176 prevents hang-up between the arms 200 and pulley 14 in the event of any misalignment. Once the belt 22 moves into the seat 210, the arm 180 is pivoted so that the belt 22 is moved to a desired point for removal. Removal can be simply accomplished by pivoting the arms 200 counterclockwise so that the ramp 208 now guides the belt 22 out of the seat 210.

The spring 196 also cushions the force of the arm 180 driving against the stop 192 upon the arm 180 being retracted from the solid line position of FIGS. 1 and 2 to the position wherein a completed belt is removed from the arms 200.

The pole 176 has a fixed, radially extending arm 212 which mounts an end of the coil spring 196. The other end of the spring 196 is connected to an upright post 214 on the arm 180. Upon the arm 180 being pivoted counterclockwise in FIG. 2 about the pivot 182, the projection 190 engages a ramp surface 216 on the stop 192 and rides down the ramp surface 216 from right to left in FIG. 2, to rotate the pole 176 counterclockwise against the bias of spring 196. The spring thereby cushions the impact of the arm 180 moving against the stop 192 as the pole 176 realizes the belt removal position for the completed belts.

The overall operation of the inventive apparatus is as follows. Initially the plates 48 are pivoted away from their respective booms 40 at which time belt preforms are loaded along the length of the booms 40. The plates 48 are then pivoted downwardly to confine the supply of belts in a uniform orientation on the booms 40.

The piston 104 on the cylinder 100 is retracted so that the pusher plate 84 on the belt push-out mechanism 34 is in the FIG. 1 position. The post 42 is then indexed so that the desired boom 40 is located beneath the pusher plate 84. The cylinder 70 is then operated to elevate the active boom 40 into operative relationship with the pusher plate 84.

The cylinder 100 is then operated to extend piston 104 and thereby shift the pusher plate 84 from right to left in FIG. 1 which forces the supply of preforms 22 on the boom 40 one by one past the sensor 114 on the belt shuttle mechanism 36. The sensor 114, upon sensing a passing belt, produces a signal to drive cylinder 168 to lower the belt grasping plates 150, 152 so that the sensed belt preform 22 arrives at the pick-up area 122 as the plates 150, 152 are lowered thereover. The cylinder 160 is then operated to retract piston 162 and thereby cause the plates 150, 152 to grasp the belt preform 22 at the pick-up area 122.

Pulley 16 is shifted vertically upwardly towards pulley 14 so that the center-to-center spacing of the pulleys 14, 16 is substantially less than the center-to-center distance of the belt preform 22 to be entrained on the pulleys 14, 16. Cylinder 140 is operated to retract piston 144 so that the preform 22 grasped between plates 150, 152 is aligned over the pulleys 14, 16. The cylinder 160 is then operated to extend the piston 162 so that the plate 152 moves away from the plate 150 and that the belt is released. The belt shuttle mechanism 36 can then be moved back into alignment over the beam 40 for delivery of another belt 22.

Once the belt 22 is entrained around the pulleys 14, 16, the driven pulley 16 is moved away from the drive pulley 14 a predetermined amount to put a desired tension on the belt. A cutting or abrading operation can then be performed simultaneously on the belt side edges 22, 28 and, upon completion thereof, the belt removing mechanism 38 is pivoted so that the arms 200 thereon are adjacent to the pulley 14. The pulley 16 is then translated towards pulley 14 to release the tension on the belt 22. The cylinder 202 is operated to pivot the arms 200 and thereby draw the belt 22 off of the pulleys 14, 16 and into the seat 210. The post 176 is then pivoted through swivel mechanism 178 so that the completed belt is delivered to a point of use.

The entire apparatus has synchronized parts that automatically load belts from a supply onto pulleys for the performance of a cutting operation and thereafter remove the completed belt to be delivered to a point of use. Accordingly, a substantial savings in time and effort result over systems that manually perform these operations.

We claim:

1. A power transmission belt transfer mechanism comprising:
    push-out means for delivering power transmission belts seriatim to a pick-up position;
    grasping means for grasping a portion of a belt at said pick-up position;
    shuttle means for transferring the grasped belt to a release position;
    release means for causing release of the grasped belt from the grasping means to a work station; and
    removal means for removing the belt from the work station for permitting similar transfer of subsequent belts seriatim by said transfer mechanism.

2. The power transmission belt transfer mechanism of claim 1 wherein a pulley is provided at said work station and said release means comprises means for dropping the grasped belt to have an upper portion thereof fall into entrained relationship with said pulley.

3. The power transmission belt transfer mechanism of claim 1 wherein said push-out means comprises means for storing a plurality of power transmission belts in side-by-side horizontal relationship and means for urging the plurality of belts laterally to deliver a leading one of the plurality to said pick-up position.

4. The power transmission belt transfer mechanism of claim 1 wherein said grasping means comprises vertically adjustable means for adjusting the elevation of the grasping means relative to a belt at said pick-up position.

5. The power transmission belt transfer mechanism of claim 1 wherein said shuttle means includes belt detecting means having a sensor for detecting the delivery of the belt to said pick-up position, and means responsive thereto for causing said grasping means to grasp said portion of the belt at said pick-up position.

6. The power transmission belt transfer mechanism of claim 1 wherein said removal means comprises means for lifting the belt from the work station and subsequently moving the lifted belt laterally away from said work station.

7. The power transmission belt transfer mechanism of claim 1 wherein said removal means comprises means for lifting the belt from the work station and subsequently swivelling the lifting means about an upright axis to move the lifted belt laterally away from said work station.

8. The power transmission belt transfer mechanism of claim 1 wherein said grasping means comprises vertically adjustable means for adjusting the elevation of the grasping means relative to a belt at the pick-up position and stop means for limiting the upward adjustment of the grasping means to a preselected elevation wherein the elevation of the grasped belt portion is a small distance above the work station.

9. The power transmission belt transfer mechanism of claim 1 wherein said push-out means includes a horizontal belt storage carrier, a pusher and means for moving the pusher incrementally lengthwise of the carrier to urge belts hung on said carrier incrementally to said transfer position.

10. The power transmission belt transfer mechanism of claim 1 wherein said belts define opposite side faces and said grasping means comprise grasping elements having grasping faces disposed substantially parallel to said belt side faces to have facial engagement therewith in the grasping operation.

11. A power transmission belt transfer mechanism comprising:
    push-out means for delivering looped power transmission belts seriatim to a pick-up position;
    grasping means for grasping a portion of a belt at said pick-up position;
    shuttle means for transferring the grasped belt to a release position;
    release means for causing release of the grasped belt from the grasping means to a work station; and
    removal means for removing the belt from the work station for permitting similar transfer of subsequent belts seriatim by said transfer mechanism,
    said removal means comprising a pair of arms, means for moving said arms between spaced portions of the belt within the looped configuration thereof, and means for moving the arms upwardly to lift the looped belt upwardly from the work station.

12. The power transmission belt transfer mechanism of claim 11 wherein means are provided for swinging the arms about a vertical axis subsequent to the lifting of the belt to transfer the belt from the work station.

13. The power transmission belt transfer mechanism of claim 11 wherein said work station comprises a pulley and said belt is released to fall into entrained relationship with said pulley.

14. The power transmission belt transfer mechanism of claim 11 wherein the spacing of said arms is caused to be greater than the diameter of said pulley during the lifting of the belt in removing it from the work station.

15. The power transmission belt transfer mechanism of claim 11 in combination with a looped power transmission belt, wherein said looped belt defines an inner surface engaged by said arms.

16. The power transmission belt transfer mechanism of claim 11 wherein said means for moving the arms comprises means for swinging the arms upwardly about a horizontal axis to between the spaced portions of the belt.

* * * * *